United States Patent

Russell et al.

[11] 4,176,705
[45] Dec. 4, 1979

[54] TIRE CORD WITH A SYNTHETIC FIBER CORE

[75] Inventors: C. Paul Russell; Joseph M. Gingo, both of Akron; Oswald A. Drica-Minieris, Canton, all of Ohio

[73] Assignee: The Goodyear Tire & Rubber Company, Akron, Ohio

[21] Appl. No.: 833,466

[22] Filed: Sep. 15, 1977

Related U.S. Application Data

[63] Continuation of Ser. No. 649,899, Jan. 16, 1976, abandoned.

[51] Int. Cl.² .............................................. B60C 9/00
[52] U.S. Cl. ..................................... 152/359; 57/220; 152/361 DM
[58] Field of Search .............................. 152/354–359; 57/146, 147, 145, 149, 212, 220, 221, 222

[56] References Cited

U.S. PATENT DOCUMENTS

| 2,492,352 | 12/1949 | Bourbon | 152/357 R |
|---|---|---|---|
| 3,413,799 | 12/1968 | Lejeune | 152/357 |
| 3,504,724 | 4/1970 | Sperberg | 152/354 |
| 3,589,121 | 6/1971 | Mulvey | 57/149 |
| 3,600,350 | 8/1971 | Kwolek | 152/357 R |
| 3,686,855 | 8/1972 | Falcy et al. | 57/146 |
| 3,977,174 | 8/1976 | Boileau | 57/145 |
| 4,016,714 | 4/1977 | Crandall et al. | 57/149 |
| 4,073,330 | 2/1978 | Allard | 152/361 DM |

FOREIGN PATENT DOCUMENTS

| 570733 | 2/1959 | Canada | 57/147 |
|---|---|---|---|
| 704133 | 2/1965 | Canada | 57/147 |
| 2140568 | 2/1973 | Fed. Rep. of Germany | 57/146 |

Primary Examiner—Joseph F. Peters, Jr.
Assistant Examiner—D. W. Underwood
Attorney, Agent, or Firm—Frederick K. Lacher; Frank Pincelli

[57] ABSTRACT

A composite cord used in the reinforcement of pneumatic tires is composed of a plurality of twisted steel strands cabled around a multifilament core.

7 Claims, 2 Drawing Figures

FIG. I

TIRE CORD WITH A SYNTHETIC FIBER CORE

This is a continuation of abandoned application Ser. No. 649,899 filed Jan. 16, 1976 now abandoned.

BACKGROUND OF THE INVENTION

The invention is especially suitable in the wire reinforcement of the carcass plies and annular belt reinforcement of tires used on large trucks and earthmover-type vehicles. Such wire reinforcements or cords are normally composed of a number of steel strands which are cabled together to form the desired cord construction, each of the steel strands, in turn, being composed of a plurality of individual steel filaments or wires which are twisted together. The steel strands are designed to carry an equal share of a load imparted to the cord during the operation of the tire. Voids are inescapably formed within the cabled cord. It has been found that moisture, trapped within the tire during the building and operation of the tire, finds its way into these voids and eventually causes the corrosion of the individual steel wires. Corrosion can be prevented or greatly reduced by filling the voids or interstices of a metal cord with corrosion resistant material, such as any suitable rubber cement or adhesive, or an appropriate hydrophobic material, e.g. polyolefins, such as polyethylene, polypropylene, polybutene and copolymers of such olefins. A centrally disposed core of synthetic polyester fibers around which the steel strands are wrapped, was found highly effective in decreasing the corrosion of the steel wires. Unfortunately, such cores reduce the strength of the cord reinforcement, since the cores are simply not capable of carrying the loads that the steel strands are able to carry. A typical example of such a cord is found in U.S. Pat. No. 3,756,883 which describes a core which is purposely designed to break to allow the uncoiling of the strands that are cabled around the core. The invention is designed to provide a steel cord reinforcement with a load carrying core which does not detract appreciably from the overall strength of the reinforcement.

Briefly stated, the invention is in a steel cord reinforcement for a tire and comprises a plurality of steel strands which are cabled or spirally wrapped around a centrally disposed non-metallic core having a tensile strength which closely approximates that of the steel strands.

DETAILED DESCRIPTION OF THE INVENTION

Figure 1:
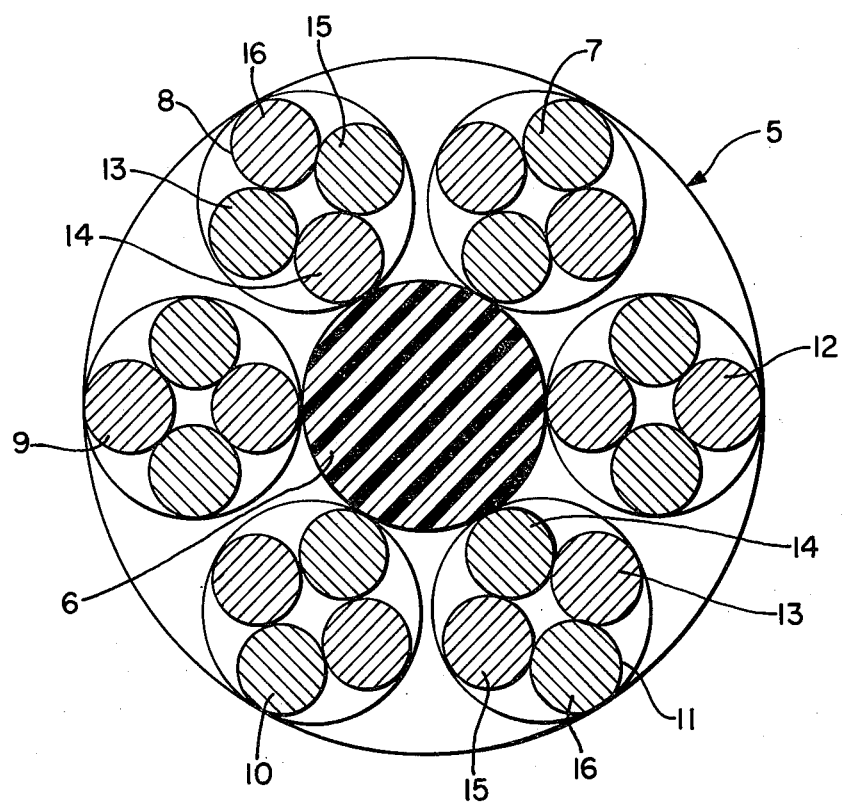
Figure 2:
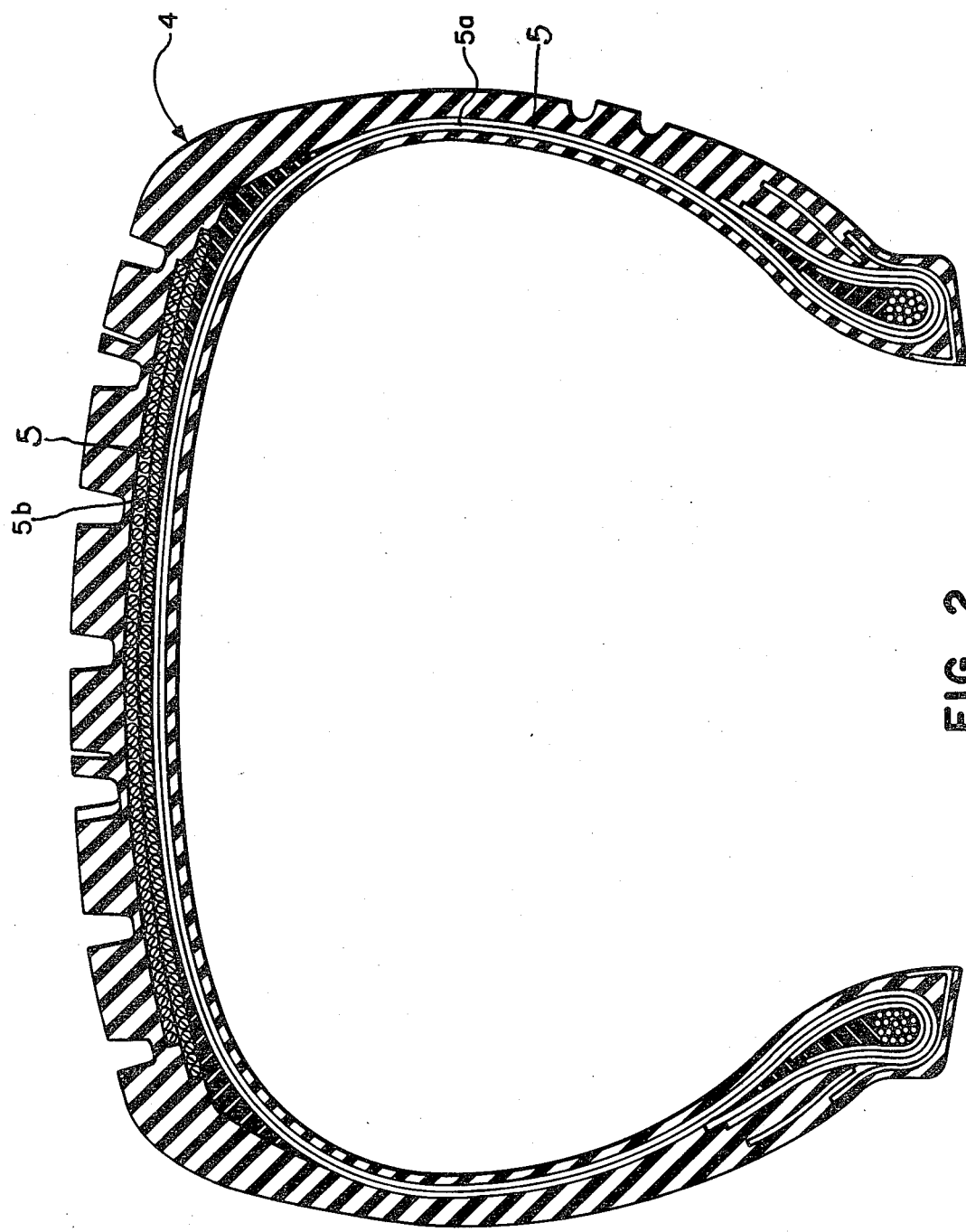

With reference to the drawings,

FIG. 1 is a cross-section of a steel tire cord 5 used in the carcass plies 5a or annular reinforcement belts 5b of large earthmover tires, and FIG. 2 is a section of a tire 4 in which there is shown layers of cords 5 each of which has a centrally disposed, non-metallic core 6 composed of inorganic, aramid filaments.

An appropriate number of steel strands 7-12 are cabled or spirally wrapped around the multifilament core 6 of aramid. The steel strands 7-12 are each composed of a desired number of steel filaments or wires 13-16 which are twisted together. The individual steel wires 13-16, in this instance, have a diameter of 0.175 millimeters, and the steel strands 7-12 each have a lay of 10 millimeters (mm) in an S direction. The steel strands 7-12, in turn, have a lay around the aramid core 6 of 19 mm. in a Z direction. The aramid core 6 has a high tensile strength which is substantially equal to, or closely approximates that of any one of the individual steel strands 7-12. A multifilament yarn or strand of aramid, having a 1500 denier, of minimal twist, and treated with an agent for increasing the adhesion between the multifilament and rubber material in which the steel cord 5 is embedded, was successfully used as a core 6. Two slightly cabled aramid yarns of 1000 denier each, similarly treated, were also successfully used as a core 6.

It is important that the aramid core 6 completely fill the centrally disposed void created by the cabled or spirally wrapped steel strands 7-12. To accomplish this, the diameter of the aramid core 6 should be at least equal to the diameter of each of the steel strands 7-12 which are equally sized. As shown in the drawings, it is beneficial to use an aramid core 6 having a circular cross-section which is slightly larger than the steel strands 7-12 to spread the strands 7-12 slightly to increase the penetration of the rubber material of the tire into the interstices of the steel cord 5 to more nearly surround the individual steel filaments 13-16 of each of the steel strands 7-12, thereby reducing the voids in which moisture can become trapped and corrode adjacent wires. The aramid core 6 should not be too large to severely distort the configuration or geometry of the steel cord 5 so as to adversely affect the load-carrying characteristics or capacity of the steel cord 5.

Thus, the aramid core 6 not only acts as a load-carrying member of the composite steel and inorganic cord 5, but fills the center void created by the coiled steel strands 7-12 with rubber to impede the flow of any moisture through the cord, thereby preventing or greatly reducing corrosion of the individual steel filaments or wires 13-16 of each of the steel strands 7-12.

As previously mentioned, attempts to use cores of other synthetic fibers, such as polyester, have proven unsuccessful. The polyester core reduced corrosion of the steel wires, but was not sufficiently strong to carry its share of the load or tensile stress imparted to the cord reinforcement during the operation of a tire utilizing such cord reinforcements.

Thus, there has been provided a composite cord reinforcement which utilizes a core that not only helps prevent corrosion of the steel strands of the reinforcement but acts, in unison, with the steel strands to shoulder a share of a load imparted to the composite cord reinforcements. Such a composite cord is different from prior art composite cords which utilize a low tensile strength breakable core, or a dissolvable core, or an elastic core for holding spirally wrapped cords in coiled relation until such time as the cords are tensioned to uncoil the cords and allow limited expansion of the tire in the area of the tire in which the cords are embedded. The composite cord reinforcement of the invention is useful in passenger tires as well as larger truck and earthmover tires.

While certain representative embodiments and details have been shown for the purpose of illustrating the invention, it will be apparent to those skilled in the art that various changes and modifications may be made therein without departing from the spirit or scope of the invention.

What is claimed is:

1. A composite cord for a tire having a body of corrosion-resistant material, comprising a plurality of metal strands having equal diameters and tensile strengths and a centrally disposed unreinforced non-metallic core having a generally circular cross section around which said strands are cabled, said core having a diameter at least equal to the diameter of each of said metal strands and sufficient to hold said metal strands in a spread condition so that said corrosion-resistant material covers and adheres to said strands to prevent exposure of said metal strands to moisture, and said core having a tensile strength substantially equal to the tensile strength of any one of said metal strands so as to maintain said strands in said spread condition under tension and carry a proportional amount of the load imparted to said strands and said core.

2. The reinforcement of claim 1, wherein the core is composed of aramid.

3. The reinforcement of claim 2, wherein the metal strands are steel, and each of the strands comprise a plurality of individual wires which are cabled together.

4. A tire having a body of corrosion-resistant material comprising at least one layer of cords reinforcing the tire, each of said cords of said layer consisting of a plurality of metal strands having equal diameters and tensile strengths and a centrally disposed unreinforced non-metallic core having a generally circular cross section around which the strands are cabled, said core having a diameter at least equal to the diameter of each of said metal strands and sufficient to hold said metal strands in a spread condition so that said corrosion-resistant material covers and adheres to said strands to prevent exposure of said metal strands to moisture, and said core having a tensile strength substantially equal to the tensile strength of any one of said metal strands so as to maintain said strands in said spread condition under tension and carry a proportional amount of the load imparted to said strands and said core.

5. The tire of claim 4, wherein the core is composed of aramid.

6. The tire of claim 4, wherein the layer of said cords reinforces at least one carcass ply of the tire.

7. The tire of claim 4, wherein the layer of said cords reinforces at least one annular belt ply of the tire.

* * * * *